US009484890B1

(12) United States Patent
Cazzaniga et al.

(10) Patent No.: US 9,484,890 B1
(45) Date of Patent: Nov. 1, 2016

(54) SYSTEMS AND METHODS TO REDUCE QUADRATURE ERROR IN SENSORS

(71) Applicant: Maxim Integrated Products, Inc., San Jose, CA (US)

(72) Inventors: Gabriele Cazzaniga, Rosate (IT); Luciano Prandi, Bellinzago Novarese (IT); Carlo Caminada, Pregnana Milanese (IT); Federico Forte, Novara (IT)

(73) Assignee: Maxim Integrated Products, Inc., San Jose, CA (US)

(*) Notice: Subject to any disclaimer, the term of this patent is extended or adjusted under 35 U.S.C. 154(b) by 689 days.

(21) Appl. No.: 14/019,467

(22) Filed: Sep. 5, 2013

Related U.S. Application Data (60) Provisional application No. 61/750,123, filed on Jan. 8, 2013.

(51) Int. Cl.
  *G06F 19/00* (2011.01)
  *H03H 17/08* (2006.01)

(52) U.S. Cl.
  CPC .................................... *H03H 17/08* (2013.01)

(58) Field of Classification Search
  CPC ................. H03F 1/3247; H03F 2201/3233; H03F 3/24
  USPC .................................. 702/130, 182–185
  See application file for complete search history.

(56) References Cited

U.S. PATENT DOCUMENTS

| 2009/0054016 | A1* | 2/2009 | Waheed | H03F 1/3247 455/114.3 |
| 2010/0111221 | A1* | 5/2010 | Nash | H04L 27/364 375/296 |

OTHER PUBLICATIONS

Analog Devices, Inc., Norwood, MA, "Evaluation Board User Guide UG-260, ADXRS450/ADXRS453 Sensor Evaluation System," UG09751-0-7/11(0), 2011 (20pgs).

\* cited by examiner

*Primary Examiner* — Edward Raymond
(74) *Attorney, Agent, or Firm* — North Weber & Baugh LLP (57) ABSTRACT

Various embodiments of the invention provide for improved performance by reducing a quadrature error signal. In certain embodiments, this is accomplished by using a mixed-signal architecture comprising analog and digital circuit components in a closed-loop configuration that generates from a detected quadrature error signal a calibration quadrature signal that is then compensated at a virtual ground of an analog front end circuit. Some embodiments allow for pre-calibration for quadrature error and/or adaptive compensation of unwanted drift effects of the quadrature error, including temperature drifts.

20 Claims, 5 Drawing Sheets

SYSTEMS AND METHODS TO REDUCE QUADRATURE ERROR IN SENSORS

CROSS REFERENCE TO RELATED PATENT APPLICATIONS

The present application claims priority to U.S. Provisional Application No. 61/750,123, titled "Systems and Methods to Reduce Quadrature Error in Sensors," filed Jan. 8, 2013, by Gabriele Cazzaniga, Luciano Prandi, Carlo Caminada, and Federico Forte, which application is hereby incorporated herein by reference in its entirety.

BACKGROUND

A. Technical Field

The present invention relates to signal processing of sensors and, more particularly, to systems, devices, and methods of reducing quadrature error in oscillating sensor circuits.

B. Background of the Invention

Quadrature error refers to an undesired spurious signal that is one of the most important causes of saturation in the readout chain of angular rate sensors, such as gyroscopes. Since quadrature error compromises the performance of the sensor, it is desirable to completely eliminate quadrature error. Existing compensation schemes that reduce quadrature error oftentimes add circuitry, including dedicated electrodes, into the sensor to compensate for the effects of quadrature error. Such a dedicated circuit approach, however, limits the dynamic range of the sensor, wastes valuable silicon area and testing time and, ultimately, adds significant cost. A need exists to eliminate the non-idealities associated with quadrature error from oscillating sensor circuits without negatively impacting the dynamic range of the sensor.

SUMMARY OF THE INVENTION

Various embodiments of the present invention eliminate the need for dedicated compensation electrodes within a sensor and improve performance by reducing a quadrature error signal by using a mixed-signal architecture comprising analog and digital components in a closed-loop configuration. In certain embodiments, the loop comprises a dedicated demodulator that demodulates the quadrature error signal; a lowpass filter that filters unwanted harmonic signals; a quadrature controller that ensures amplitude and phase stability of the loop; and a digital-to-analog converter (DAC) that converts the detected error signal into an analog signal, which is then subtracted from an analog sensor readout signal that comprises the quadrature error.

Some embodiments provide for a unique front-end circuit that applies time-division multiplexing to detect multi-axis readout signals of a multi-axis MEMS gyroscope, to allow quadrature error compensation using a single closed feedback loop configuration. The DAC in the loop generates from a detected quadrature error signal a calibration quadrature signal that is compensated (e.g., charge compensated) at the virtual ground of the analog front end circuit (e.g., a charge amplifier).

Various embodiments allow both pre-calibration (e.g., in-fab calibration) for quadrature error and/or adaptive compensation of unwanted drift effects of the quadrature error, including time-varying factors, such as temperature drifts.

In one embodiment, an ADC (e.g., a Sigma Delta bandpass ADC) is located immediately after a front end block to further reduce silicon area by allowing the use of digital instead of analog filter stages.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
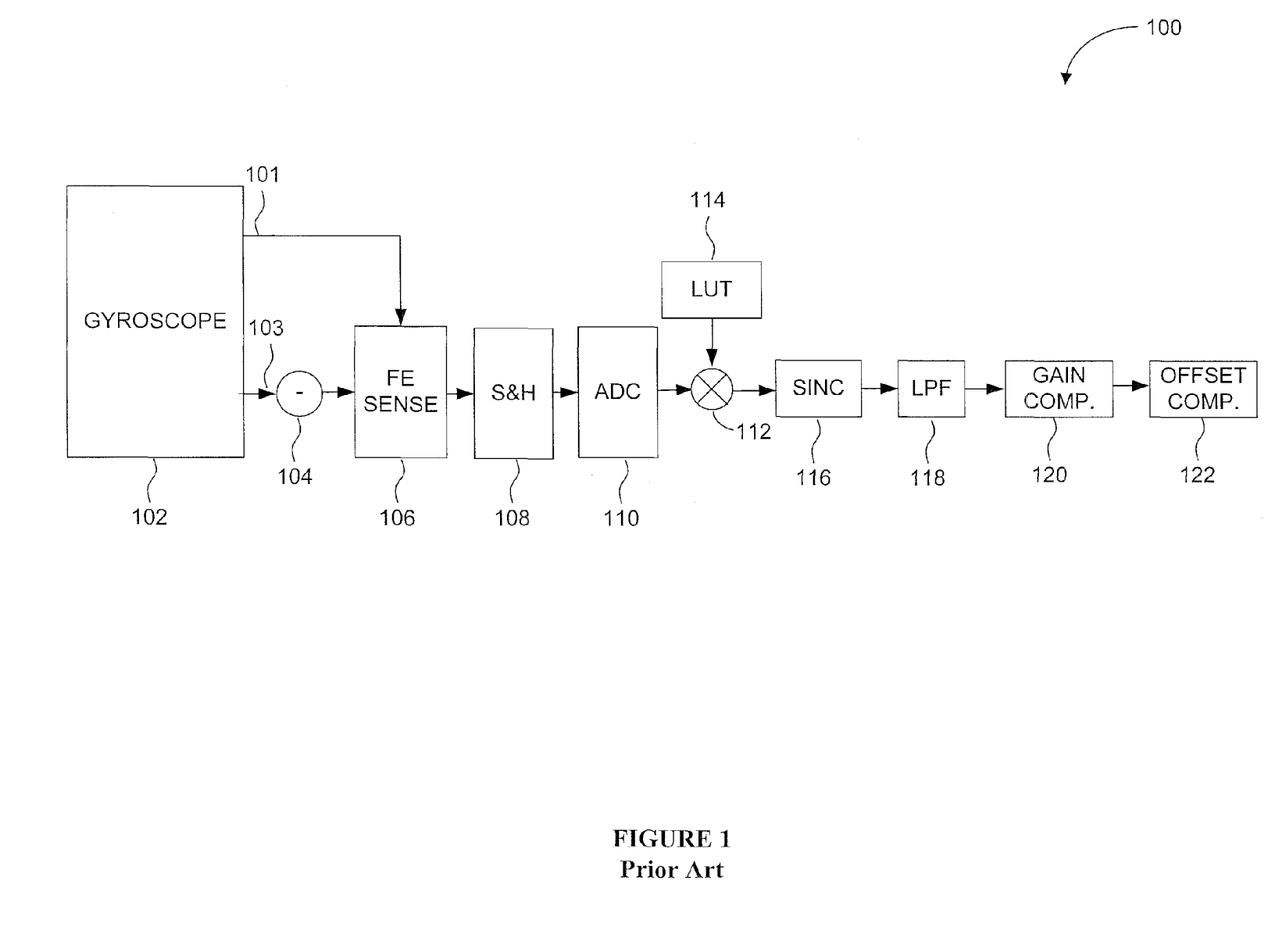
FIG. 1 is a general illustration of a prior art circuit utilizing quadrature compensation.

FIG. 1 shows a prior art block diagram of a quadrature compensation circuit. Circuit 100 comprises gyroscope 102, subtractor 104, front-end circuit 106, sample and hold circuit 108, ADC 110, demodulator 112, SINC filter 116, low pass filter 118, gain compensation circuit 334, and offset compensation circuit 122.

Circuit 100 includes within gyroscope 102 two sets of dedicated electrodes (not shown). A first set for detecting an angular rate signal and the related readout chain, and a second set, such as a pair of dedicated quadrature electrodes coupled to a quadrature error compensation circuitry that will force a signal that will internally compensate for the quadrature error within the gyroscope 102 itself. However, the added quadrature compensation circuitry leads to a larger than necessary mechanical and electrical design. Therefore, it would be desirable to have a sensor design and methods that compensate the quadrature error and its effects without negatively impacting area and power consumption.

Figure 2:
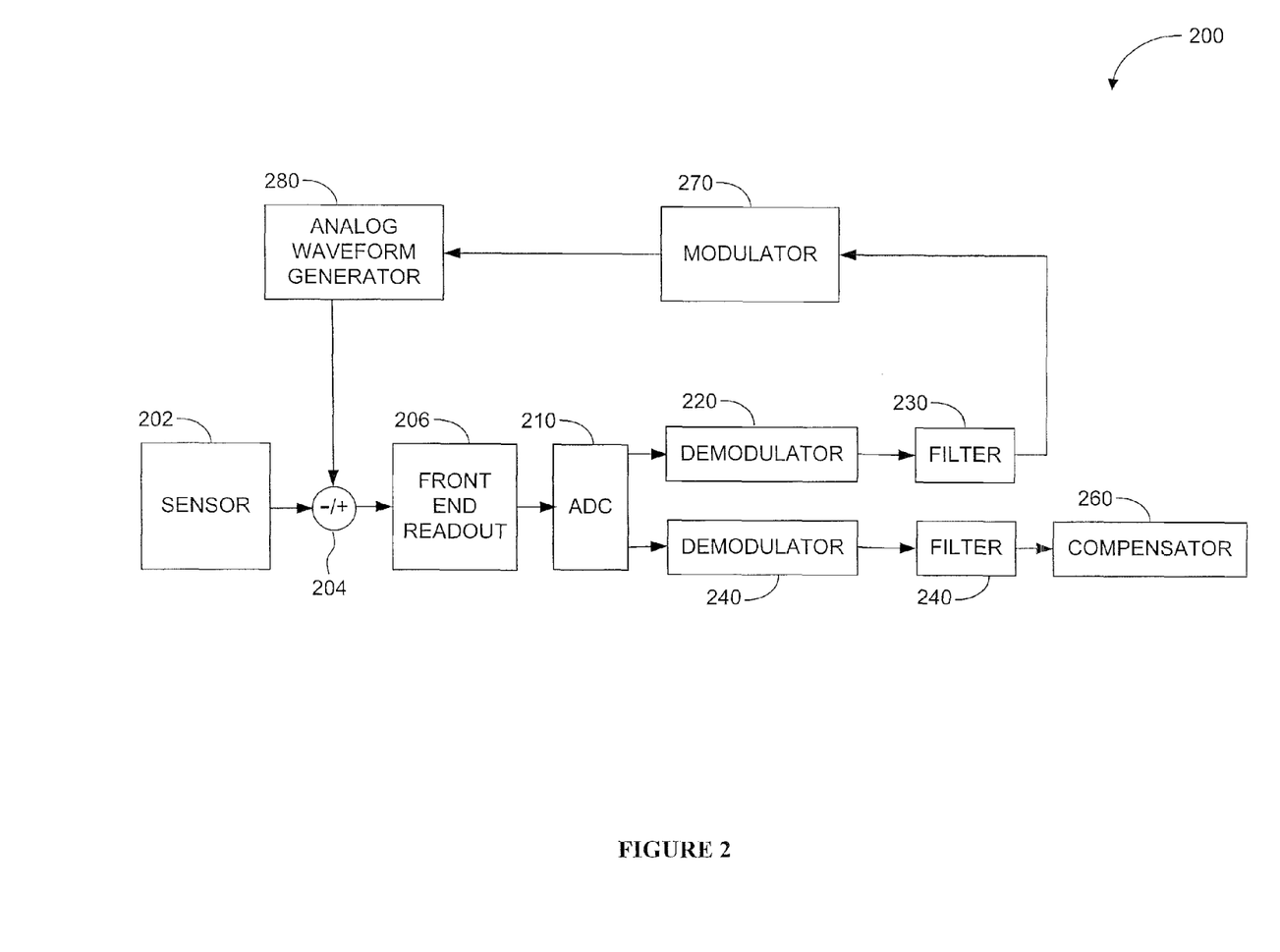
FIG. 2 is an illustrative block diagram of a quadrature compensation circuit, according to various environments of the invention.

FIG. 2 is an illustrative block diagram of a quadrature compensation circuit, according to various environment of the invention. Quadrature compensation circuit 200 comprises sensor 202, subtractor 204, ADC 210, DAC 280, front-end circuit 206, low pass filter 248, 230, compensator circuit 260, and modulator 270.

Sensor 202 represents one or more sensor units, such as sensing electrodes, that are configured to directly or indirectly measure a physical quantity and output a readout signal associated with that physical quantity. The readout signal contains a desired sensor signal and an undesired signal, such as a quadrature error signal. The readout signal output from sensor 202 is fed into subtractor 204 that combines the readout signal of sensor 202 with a calibration quadrature signal 264.

In one embodiment, DAC 280 generates calibration quadrature signal 264 that is used to compensate the quadrature error at the output of sensor 202. It is understood that subtractor 204 may be implemented within front-end circuit 206 or within sensor 302. For purposes for this application, subtractor 204 may be any combiner, including an adder. For example, calibration quadrature signal 264 provided by DAC 280 may be a periodic signal that is 180° out-of phase with the periodic quadrature error extracted from the readout signal, such that adding both signals will cause the signals to completely cancel each other when combined by adder 204.

Front-end circuit 206 is a general front-end circuit that can convert a readout signal, for example, into a voltage signal. In one embodiment, when sensor 202 is a multi-axis sensor comprising multiple sensor units, front end circuit 206 can be used in combination with a multiplexer and a demultiplexer (not shown) to process the multiple signals with a single front-end circuit. The multiplexer is coupled between subtractor 204 and front end circuit 206 to multiplex the analog readout signals, such that front-end circuit 206 receives at its input a time division multiplexed signal that front-end circuit 206 converts into the voltage signal.

In one embodiment, the output of front-end circuit 206 is passed to analog-to-digital converter (ADC) 210. ADC 210 may be a bandpass delta-sigma ($\Delta\Sigma$) ADC. However, a lowpass $\Delta\Sigma$ ADC or any suitable type of ADC, including a SAR ADC, may be employed. The output signal of ADC 210 is split into two or more separate paths. As shown in FIG. 2, a first path that comprises mainly digital components forms a feedback loop that is coupled back to subtractor 204. A purely digital second path comprises various components in a series configuration. Demodulator 220, 240 may be a digital demodulator that demodulates a digitized readout signal from the output of ADC 210, for example, via a synchronous demodulation method. The demodulated signal comprises besides the baseband 0 Hz DC signal, two additional second harmonic signals at a frequency at $2*F_D$ apart from DC. The harmonic signals are filtered out by low pass filter 248, 230, which may be any known type of digital lowpass filter design that can filter out noise signals.

In one embodiment, low pass filter 248, 230 filters out the second harmonic of the demodulated digital signal and ideally generates a pure baseband DC signal that is forwarded to modulator 270. Removing the second harmonic from the feedback loop prevents potential instabilities in the first path. In addition, the feedback loop may comprise a controller to ensure amplitude and phase stability of the closed control loop.

In one embodiment, the feedback loop comprises digital modulator 254 coupled between DAC 280 and filter 230. However, modulator 254 may equally be implemented as an analog modulator at the output of DAC 280. Calibration quadrature signal 264 may be made equal in amplitude and phase to the analog readout signal at the output of sensor 202, such that when the two waveforms are combined in subtractor 204, the quadrature error is completely canceled from the readout signal, for example, by way of subtraction.

It is understood that portions of the circuit may be duplicated. For example, in order to process multiple sensors, multiple front end circuits may be used to process signals. One skilled in the art will further appreciate that choppers, de-choppers, and other additional signal processing components may be used at various locations in the signal path to further process readout signals depending on the type of sensor and sensor signals to be processed. For example, in the single loop configuration example presented in FIG. 2, the analog readout signal of sensor 202 may be chopped by a chopper and de-chopped by a de-chopper located after front-end circuit 206. A chopper and de-chopper may also be used to reduce noise when processing a sensor signal.

Figure 3:
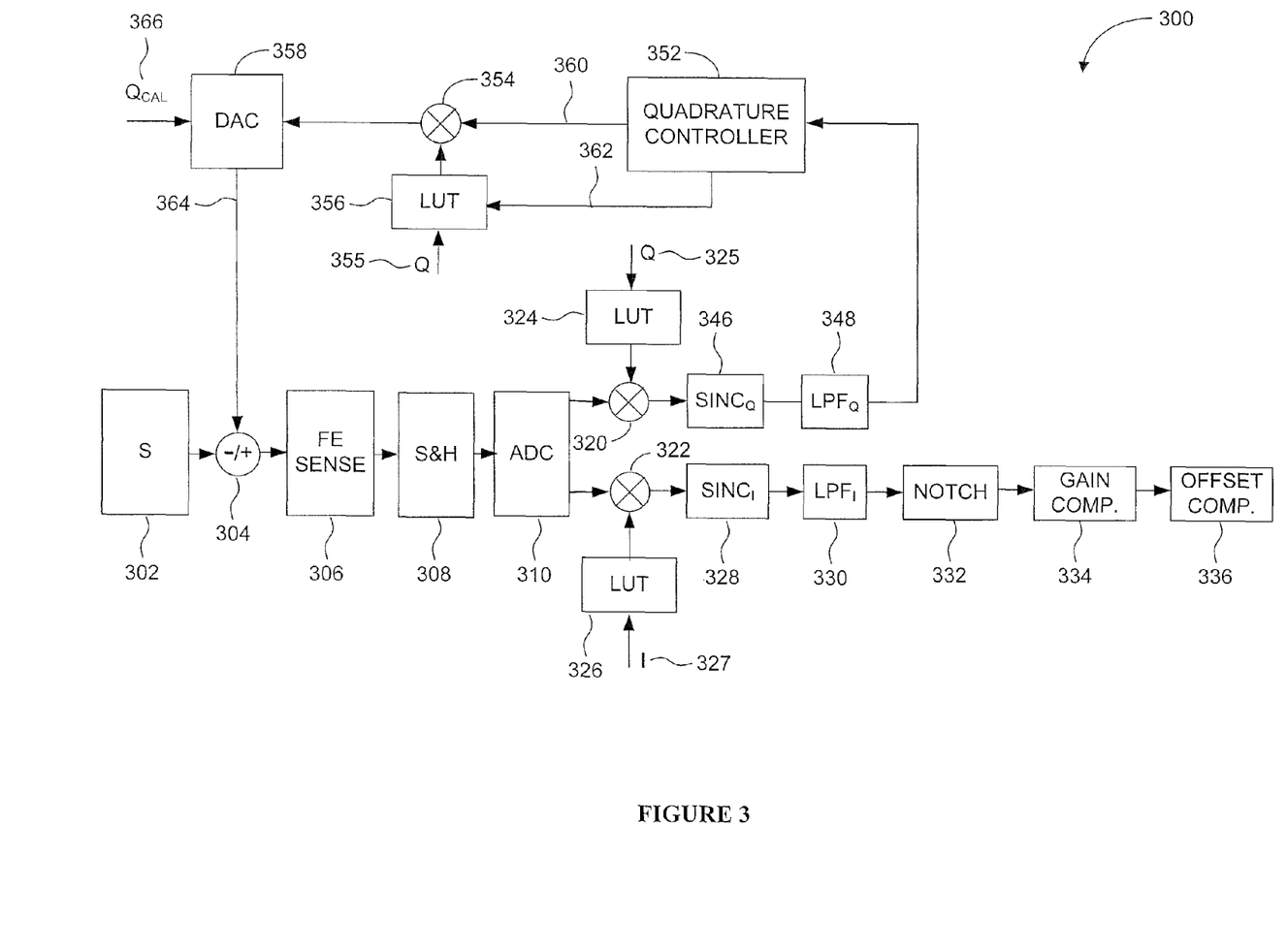
FIG. 3 is an illustrative schematic comprising a quadrature compensation circuit, according to various environments of the invention.

FIG. 3 is an illustrative schematic comprising a quadrature compensation circuit, according to various embodiments of the invention. Quadrature compensation circuit 300 comprises sensor 302, subtractor 304, front-end circuit 306, sample and hold circuit 308, ADC 310, demodulator 320, 326, SINC filter 346, 328, low pass filter 348, 330, quadrature controller 352, modulator 354, LUT 356, and digital-to-analog converter (DAC) 358, notch filer 332, gain compensation circuit 334, and offset compensation circuit 336.

Sensor 302 represents a sensing electrode that converts a measured physical quantity into a readout signal, such as a voltage, a current, or a charge. While a single axis gyroscope implementation is shown in FIG. 3, it is understood that, sensor 302 may comprise, for example, a multi-axis gyroscope having three sets of sensor units that electro-mechanically measure angular rates along three orthogonal axes to output a proportional readout signal. The readout signal contains, in addition to a desired sensor signal, an undesired quadrature error signal. Each sensor unit may be associated with one axis and generate a separate readout signal in response to the displacement of a proof mass that resonates at the drive frequency $F_D$ of the sensor unit. Each readout signal output from sensor 302 is fed into subtractor 304 that combines the readout signal of sensor 302 with calibration quadrature signal 364.

In one embodiment, subtractor 304 may represent the virtual ground of a charge amplifier (not shown) within front-end circuit 306. In this example, calibration quadrature signal 364 is generated at the output of DAC 358 is a charge signal that cancels the quadrature error at the input of the charge amplifier. Subtractor 304 may be a standalone device or embedded into one of front-end circuit 306 or sensor 302.

Front-end circuit 306 is a general front-end circuit that converts the readout signal representative of a sensor variation (e.g., a capacitive variation) that front-end circuit 306 receives at its input, for example, into a voltage signal representative of a voltage variation. Front end circuit 306 may be implemented as a switched-capacitor network comprising a coupled-charge amplifier or a transimpedance amplifier operating in the continuous time-domain. Generally, the processed analog readout signal of sensor 302 may be a voltage, a current, or a charge.

In one embodiment, a multiplexer (not shown) is coupled between subtractor 304 and front end circuit 306 to multiplex the analog readout signals, such that front-end circuit 306 receives at its input a multiplexed signal that front-end circuit 306 converts into a voltage signal. In that example, a closed feedback loop common to all three sensor readout signals may be employed. This is accomplished by time-division multiplexing the readout signals. Then the readout signals are forwarded to a simple sample and hold circuit 308, which samples and holds their voltage for a predetermined period of time.

In another embodiment, signals of all three axes are simultaneously read out, for example, in a time-division manner through a common front end circuit. In that example, a multiplexer may be coupled to the input of front-end circuit 306 and a demultiplexer may be coupled at the output of front-end circuit 306. The demultiplexer processes the output signals of front end circuit 306 to divide the signals into three separate signal paths, each coupled to a dedicated closed feedback loop to separately compensate for the quadrature error signal associated with each axis.

In one embodiment, the output of front-end circuit 306 is a voltage signal that is passed to sample and hold circuit 308, which outputs the voltage to $\Delta\Sigma$ ADC 310. It is noted that sample and hold circuit 308 is optional. For example, in a time-division switched-capacitor circuit embodiment that uses a continuous-time $\Delta\Sigma$ ADC rather than a time-discrete $\Delta\Sigma$ ADC.

ADC 310 converts the analog signal it receives into the digital domain. ADC 310 may operate at a sampling frequency that is a multiple of the drive frequency $F_D$, i.e., $F_{ADC}=M*F_D$, where $M>>2$. In one embodiment, the output of front-end circuit 306 is directly coupled to ADC 310.

The output signal of ADC 310 is split into two separate paths. In this example, the first path comprises demodulator 320, $SINC_Q$ filter 346, low pass filter 348, quadrature controller 352, modulator 354, LUT 356, and DAC 358. The second path comprises demodulator 322, $SINC_I$ filter 328, low pass filter 330, notch filter 332, gain compensation module 334, and offset compensation module 336.

LUT 324, 326, 356 stores digital representations of periodical waveforms, including sinusoidal and rectangular waveforms. In particular, LUT 324 may store quadrature phase information, for example the form of a sinusoidal waveform, that is used in performing the demodulation, whereas LUT 326 may comprise in-phase information related to the sensor resonance signal $F_D$. In one embodiment, demodulator 320, 322 may be a digital demodulator that receives the digitized readout signal from the output of ADC 310, and data from its respective LUT 324, 326. Demodulator 320, 322 may demodulate the digitized readout signal having a frequency $F_D$ with the periodic waveform having the same frequency as the waveform provided by LUT 324, 326.

In one embodiment, a synchronous demodulation scheme is employed. Demodulator 320 multiplies the digitized quadrature signal with the waveform signal received by LUT 324. Since both signals represent two periodic waveforms that are in phase with each other, the quadrature error will be synchronously demodulated in the digital domain. Similarly, modulator 322 multiplies the sensor signal with the waveform signal received by LUT 326, which are also in phase with each other. The waveform signal LUT 324 provides to demodulator 320 may have the same frequency as the waveform signal LUT 326 provides to demodulator 322 but the two waveform signals may be are phase delayed by 90° with respect to each other. The resulting demodulated signals comprise besides the baseband 0 Hz or DC signal two additional second harmonic signals at a frequency at $2*F_D$ apart from DC. In this example, the quadrature signal that is processed by demodulator 320 and the sensor signal that is processed by demodulator 322 are phase delayed by 90° with respect to each other.

The demodulated signal may be fed into $SINC_Q$ filter 346 and $SINC_I$ filter 328, respectively. SINC filter 346, 328 is a common decimation filter downsamples, for example by a predetermined factor, the relatively high frequency digital signal generated by ADC 310. SINC filter 346, 328 simplifies subsequent computations of the signal along the each respective path.

Low pass filter 348, 330 filters out the second harmonic of the demodulated digital signal that it receives and ideally generates a pure baseband DC signal that is forwarded downstream from low pass filter 348, 330. Removing the second harmonic from the feedback loop prevents potential instabilities in the first path. In the second path, notch filter 332 may filter out one or more dedicated frequencies. In one embodiment, low pass filter 348, 330 is combined with SINC filter 346, 328 and implemented as a low-pass decimation filter.

Quadrature controller 352, may be used to ensure amplitude and phase stability of the closed control loop. Low pass filter 348 provides quadrature controller 352 a DC signal that represents the amplitude of the quadrature error that is sought to be reduced or canceled. In one embodiment, controller 352 is coupled to control both the phase and the amplitude of the demodulated signal. Quadrature controller 352 provides signal 360, 362 to modulator 354 and LUT 356, respectively to control the gain via gain signal 360 and the phase via phase signal 362. Gain signal 360 is directly coupled to modulator 354 while phase signal 362 is coupled to modulator 354 via LUT 356. In this example, LUT 356 receives no external phase shift signal since the phase is controlled by quadrature controller 352, which may be implemented as a PID controller or any other type of controller.

Modulator 354 is further coupled to DAC 358, which may be a common capacitive DAC to convert the digital signal from demodulator 354 into the analog domain. Calibration quadrature signal 364 may be equal in amplitude and phase to the quadrature error component of the analog readout signal at the output of sensor 302, such that when the two waveforms are combined in subtractor 304, the quadrature error is completely canceled from the readout signal. As discussed previously, other methods of amplitude and phase cancellation may be employed to achieve effective quadrature error cancellation. For example, LUT 356 may receive an inverted Q signal that is used to phase shift calibration quadrature signal 364 by 180° with respect to the readout signal prior to providing it to adder 304.

It is further envisioned that the cancellation occurs at any other suitable location other than at the output of sensor 302. One skilled in the art will appreciate that modulator 354 and LUT 356 may be implemented within quadrature controller 352, or even in a separate block after quadrature controller 352. In the latter case modulator 354 may be an analog modulator.

In one embodiment, DAC 358 converts modulated DC signal 360 into a sinusoidal signal, such that calibration quadrature signal 364 is also sinusoidal in nature. In one embodiment, DAC 358 may retrieve calibration data $Q_{CAL}$ 366 (e.g., a 16-bit word) from a memory, such as a programmable register within a die. The calibration process may be automatically initiated at time t=0 by performing a full sweep of the $Q_{CAL}$ register in order to synchronize the phases and amplitudes of demodulator 322 and $Q_{CAL}$ signal 366 to enable real-time compensation of the quadrature error. This is accomplished, for example, by a simple DAC that uses a modulator to generate calibration quadrature signal 364. Depending on whether compensation is performed only at time t=0, modulator circuit 354 may be embedded into DAC 358 or implemented as an analog modulator at the output of DAC 358.

Any combination of pre-calibration and adaptive compensation is envisioned. For example, circuit 300 may be pre-calibrated using factory settings, and later in operation circuit 300 may perform timed or continuous calibrations or self-calibrations to account drifts of the quadrature error over time and/or temperature.

Figure 4:
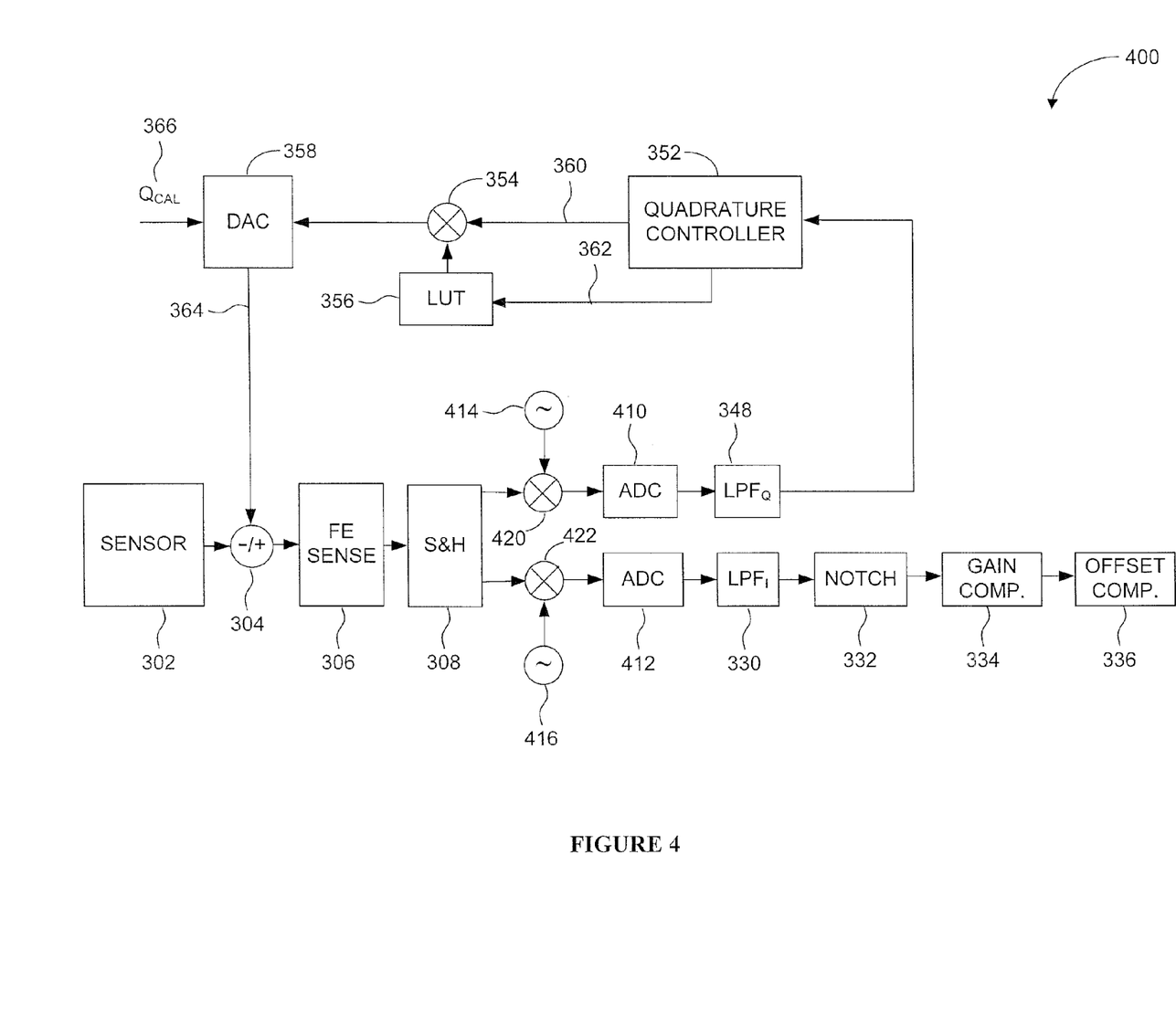
FIG. 4 is another illustrative schematic comprising a quadrature compensation circuit, according to various environments of the invention.

FIG. 4 is another illustrative schematic comprising a quadrature compensation circuit, according to various embodiments of the invention. For clarity and brevity, components similar to those shown in FIG. 3 are labeled in the same manner and a description or their function is not repeated. In circuit 400 demodulators 420 and 422 are located between sample and hold circuit 308 and ADC 410 and 412, respectively. In this example, the demodulation occurs in the analog domain. Demodulator 420, 422 is coupled to a waveform generator 414, 416 instead of a lookup table that stores a digital representation of a waveform, as previously discussed with reference to FIG. 3. Waveform generator 414, 416 generates, for example, a sinusoidal waveform that is used as the reference for the demodulation by demodulator 420, 422. In one embodiment, instead of asynchronous sinusoidal waveform generators, the resonance signal $F_D$ of sensor 302 is used to perform synchronous demodulation.

Figure 5:
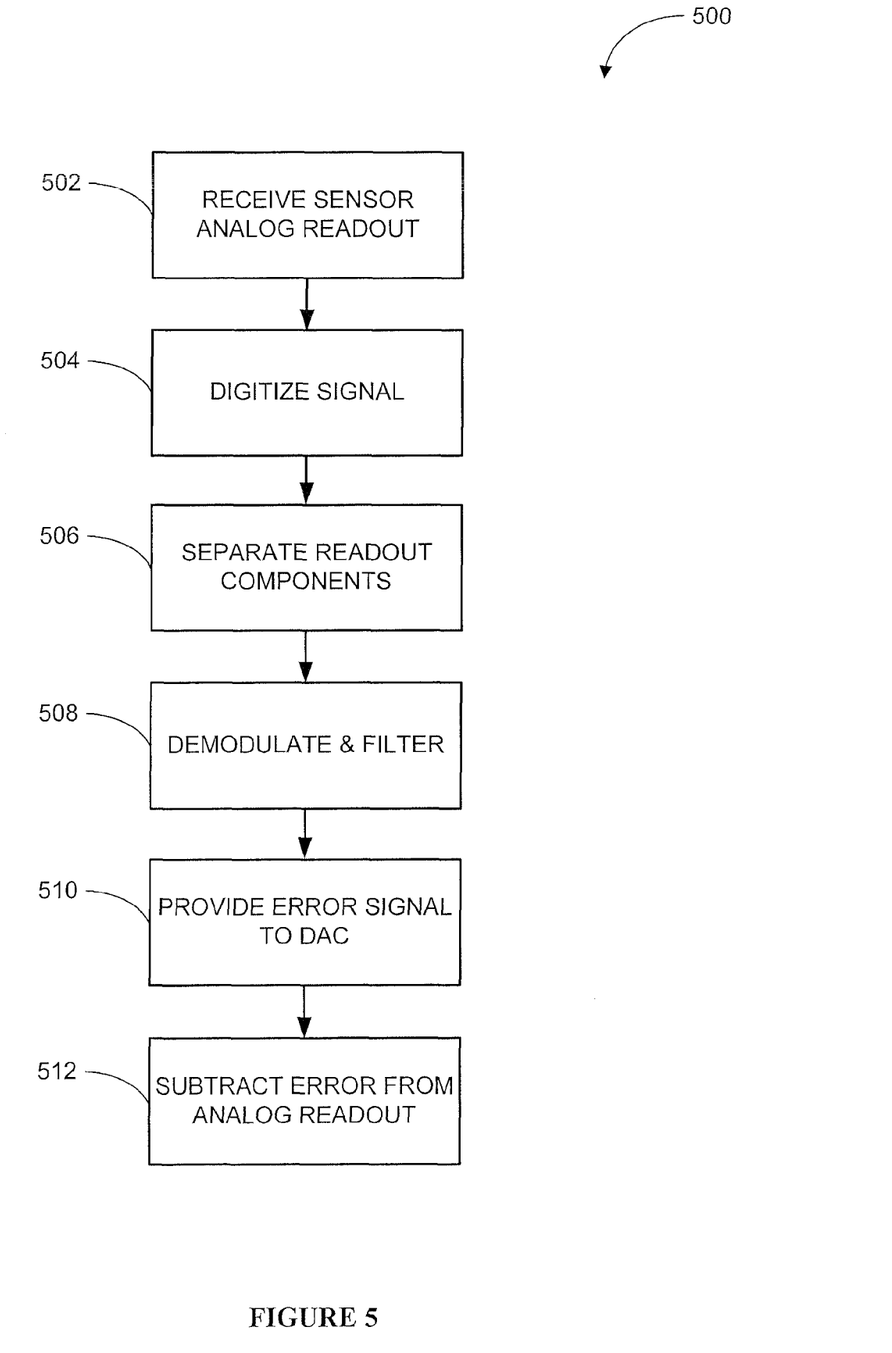
FIG. 5 is a flowchart of an illustrative process for quadrature error compensation, in accordance with various embodiments of the invention.

FIG. 5 is a flowchart of an illustrative process for quadrature error compensation, in accordance with various embodiments of the invention.

The process for quadrature error compensation starts at step 502 when an analog readout signal is received from a sensor. The readout signal may be generated, for example, by a tri-axis gyroscope. The readout signal comprises a sensor signal and a quadrature error signal.

At step 504, the analog readout signal is converted into a digital signal by an analog-to-digital converter.

At step 506, the readout signal is divided into two or more components, such as the sensor signal and the quadrature error signal.

At step 508, the quadrature error signal is provided to a demodulator that demodulates the signal, and to a filter that decimates and lowpass filters the quadrature error signal, prior to forwarding the modulated and filtered signal to a DAC, at step 510.

At step 512, the quadrature error signal in the subtracted from the analog readout signal to cancel out any contribution of the quadrature error.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

What is claimed is:

1. A quadrature compensation circuit to reduce quadrature error, the circuit comprising:
   a front-end circuit coupled to receive a first signal that comprises a quadrature error component, the front-end circuit outputs an analog signal;
   a first demodulator coupled to the front-end circuit, the first demodulator demodulates the analog signal and is configured to output a first demodulated signal related to the quadrature error component;
   a low pass filter coupled to the first demodulator, the low pass filter is coupled to filter out a harmonic signal from the first demodulated signal to generate a DC signal that is representative of an amplitude of the quadrature error;
   a modulator coupled to receive the DC signal, the modulator is configured to output a modulated DC signal; and
   a DAC coupled to the modulator, the DAC generates a calibration quadrature signal.

2. The quadrature compensation circuit according to claim 1, further comprising a combiner coupled to the front-end circuit and the DAC, the combiner is configured to combine a readout signal and the calibration quadrature signal and to output the first signal.

3. The quadrature compensation circuit according to claim 2, wherein the combiner represents a virtual ground of a charge amplifier.

4. The quadrature compensation circuit according to claim 1, wherein the modulator comprises a quadrature controller that controls at least one of a phase and an amplitude of the first demodulated signal.

5. The quadrature compensation circuit according to claim 4, further comprising a first lookup table coupled to receive a phase signal from the quadrature controller.

6. The quadrature compensation circuit according to claim 1, further comprising a second lookup table coupled to the first demodulator, the second lookup table stores a digital representation of a periodic waveform that the first demodulator uses in performing a demodulation.

7. The quadrature compensation circuit according to claim 1, wherein the low pass filter is combined with a SINC filter to form a low-pass decimation filter.

8. The quadrature compensation circuit according to claim 1, wherein the modulated DC signal is 180° out of phase with respect to the readout signal.

9. The quadrature compensation circuit according to claim 1, wherein the first demodulator is an analog demodulator.

10. The quadrature compensation circuit according to claim 9, further comprising a waveform generator that generates a sinusoidal waveform that is used as a reference for the demodulation by the analog demodulator.

11. The quadrature compensation circuit according to claim 1, wherein the modulator is an analog modulator that receives an output signal from the DAC.

12. A method to cancel quadrature error, the method comprising:
    receiving a first signal comprising quadrature error component;
    generating from the first signal a second signal that comprises the quadrature error component;
    demodulating the second signal;
    lowpass filtering the second signal;
    converting the second signal into an analog calibration quadrature signal; and
    combining the calibration quadrature signal and the first signal to cancel the quadrature error component.

13. The method according to claim 12, wherein combining comprises subtracting the calibration quadrature signal from the first signal.

14. The method according to claim 12, further comprising storing quadrature phase information related to a sensor resonance signal, wherein the sensor resonance signal and the quadrature phase information share a same frequency.

15. The method according to claim 14, wherein demodulating comprises performing synchronous demodulation using the sensor resonance signal.

16. The method according to claim 12, further comprising decimating the second signal to downsample the second signal by a predetermined factor.

17. The method according to claim 12, further comprising performing at least one of a timed calibration, a pre-calibration using factory settings, a continuous calibration, and a self-calibration.

18. A quadrature compensation system to reduce quadrature error, the system comprising:
    a sensor that outputs a sensor signal that comprises a quadrature error component;
    a front-end circuit coupled to receive the sensor signal and output an analog signal;
    a first demodulator coupled to the front-end circuit, the first demodulator demodulates the analog signal and is configured to output a first demodulated signal related to the quadrature error component;
    a low pass filter coupled to the first demodulator, the low pass filter is coupled to filter out a harmonic signal from the first demodulated signal to generate a DC signal, the DC signal is representative of an amplitude of the quadrature error;
    a quadrature controller coupled to receive the DC signal, the quadrature controller is configured to output a modulated DC signal;
    a DAC coupled to receive the modulated DC signal to generate a calibration quadrature signal; and
    a combiner coupled to the front-end circuit and the DAC, the combiner is configured to output combine a readout signal and the calibration quadrature signal to generate the first signal.

19. The system to reduce quadrature error according to claim 18, wherein the sensor is a tri-axis gyroscope and the analog signal is one of a voltage signal, a current signal, and a charge.

20. The system to reduce quadrature error according to claim 19, further comprising a multiplexer coupled between the combiner and the front-end circuit, the multiplexer processes the sensor signal and outputs a time-division multiplexed signal.

* * * * *